United States Patent
Chien et al.

(10) Patent No.: US 10,101,718 B2
(45) Date of Patent: Oct. 16, 2018

(54) SMART APPLIANCE CONTROL SYSTEM

(71) Applicant: Cameo Communications, Inc., Taipei (TW)

(72) Inventors: Chih-Hao Chien, Taipei (TW); Hsiu-Chi Yang, Taipei (TW)

(73) Assignee: Cameo Communications, Inc., Taipei (TW)

( * ) Notice: Subject to any disclaimer, the term of this patent is extended or adjusted under 35 U.S.C. 154(b) by 177 days.

(21) Appl. No.: 15/245,197

(22) Filed: Aug. 24, 2016

(65) Prior Publication Data

US 2017/0090442 A1 Mar. 30, 2017

(30) Foreign Application Priority Data

Sep. 25, 2015 (TW) .............................. 104131875 A

(51) Int. Cl.
*G05B 15/02* (2006.01)
*H04W 4/80* (2018.01)
(Continued)

(52) U.S. Cl.
CPC ............. *G05B 15/02* (2013.01); *G06F 3/017* (2013.01); *G06F 3/0231* (2013.01); *G06F 3/167* (2013.01); *G06F 11/00* (2013.01); *G08C 17/02* (2013.01); *H04L 12/2818* (2013.01); *H04M 11/007* (2013.01); *H04W 4/80* (2018.02);
(Continued)

(58) Field of Classification Search
CPC .......... H04W 4/80; G05B 15/02; G06F 3/017; G06F 3/0231; G06F 3/167
See application file for complete search history.

(56) References Cited

U.S. PATENT DOCUMENTS

| 2008/0154611 A1* | 6/2008 | Evermann | ......... G06F 17/30899 |
| | | | 704/275 |
| 2012/0242526 A1* | 9/2012 | Perez | ..................... G08C 17/02 |
| | | | 341/176 |

(Continued)

FOREIGN PATENT DOCUMENTS

| CN | 101193018 A | 6/2008 |
| CN | 101873009 A | 10/2010 |

(Continued)

*Primary Examiner* — Ziaul Karim
*Assistant Examiner* — Vincent W Chang
(74) *Attorney, Agent, or Firm* — CKC & Partners Co., Ltd.

(57) ABSTRACT

A smart appliance control system includes a memory device, a connecting interface device and a central controlling device. The central controlling device converts a control command into at least one appliance control command. A first smart mobile device receives a user command and processes it as a control command. The connecting interface device receives the control command and sends it to the central controlling device. The central controlling device executes one of operations as follows according to the control command: (A) A corresponding action is executed, and the control command and information of the corresponding action are backed up in a memory device; and (B) the control command is converted into the appliance control command and sent to at least one appliance, and the control command, the appliance control command and the information of the corresponding action are backed up in the memory device.

13 Claims, 5 Drawing Sheets

(51) Int. Cl.
*G06F 3/01* (2006.01)
*G06F 3/023* (2006.01)
*G06F 3/16* (2006.01)
*G08C 17/02* (2006.01)
*H04L 12/28* (2006.01)
*H04M 11/00* (2006.01)
*G06F 11/00* (2006.01)
*H04W 88/02* (2009.01)

(52) U.S. Cl.
CPC ..... *G08C 2201/30* (2013.01); *G08C 2201/31* (2013.01); *G08C 2201/32* (2013.01); *G08C 2201/93* (2013.01); *H04W 88/02* (2013.01)

(56) References Cited

U.S. PATENT DOCUMENTS

| | | | |
|---|---|---|---|
| 2014/0111318 A1* | 4/2014 | Arling | G08C 17/02 340/12.22 |
| 2015/0077737 A1* | 3/2015 | Belinsky | G01N 15/0211 356/51 |
| 2015/0222852 A1* | 8/2015 | Carter | H04M 11/025 348/14.06 |
| 2016/0075034 A1* | 3/2016 | Laurent | H04L 12/282 700/264 |

FOREIGN PATENT DOCUMENTS

| | | |
|---|---|---|
| CN | 204374643 U | 6/2015 |
| TW | M462486 | 9/2013 |

* cited by examiner

SMART APPLIANCE CONTROL SYSTEM

RELATED APPLICATIONS

This application claims priority to Taiwan Application Serial Number 104131875, filed Sep. 25, 2015, which is herein incorporated by reference.

BACKGROUND

Technical Field

The present invention relates to control technology. More particularly, the present invention relates to a smart appliance control system.

Description of Related Art

Because of development of smart appliance recently, domestic lifestyle mode is gradually changed into smart home life. One of keys to implement the smart home life is a controller of a smart appliance. In other words, a key point to design the controller of the smart appliance would be whether using and controlling methods of the controller of the smart appliance is close to user's needs. However, as design of controller functions varies, meanwhile, it also means that manufacturing cost is unavoidably necessary to be increased.

In order to solve the above problem, those skilled in the art have been endeavoring to find a solution, but no appropriate methods have been developed for a long time. Therefore, how to effectively solve the above problem is one of the important researching topic presently and also becomes a goal for improvement in the art.

SUMMARY

In order to improve design of smart appliance control device, an aspect of the present disclosure provides a smart appliance control system, which includes a memory device, a connecting interface device and a central controlling device. The central controlling device is electrically connected to the memory device and the connecting interface device. The connecting interface device is configured to accommodate a first smart mobile device, and connected to the first smart mobile device. The central controlling device is configured to convert the control command into an appliance control command that is readable by at least one appliance. The first smart mobile device is configured to receive a user command and process the user command as a control command. The connecting interface device is configured to receive the control command that is sent by the first smart mobile device, and send the control command to the central controlling device. The central controlling device is configured to execute one of operations as follows according to the control command: (A) a corresponding action is executed, and the control command and information of the corresponding action is backed up in the memory device; and (B) the control command is converted into the appliance control command that is readable by the at least one appliance, and sending the control command to the at least one appliance to control the at least one appliance to execute the corresponding action, and backing up the control command, the appliance control command and the information of the corresponding action in the memory device.

In an embodiment of the present disclosure, the user command is an audio command. The first smart mobile device is configured to recognize the audio command to generate the control command. When the first smart mobile device is unable to recognize the audio command, the first smart mobile device is configured to connect to a server system and send the audio command to the server system. The server system is configured to advancedly recognize the audio command to generate the control command, back up the control command in a database of the server system, and return the control command to the first smart mobile device.

In an embodiment of the present disclosure, the user command is a video command. The first smart mobile device is configured to recognize the video command to generate the control command. When the first smart mobile device is unable to recognize the video command, the first smart mobile device is configured to connect to a server system and send the video command to the server system. The server system is configured to advancedly recognize the video command to generate the control command, back up the control command in a database of the server system, and return the control command to the first smart mobile device.

In an embodiment of the present disclosure, the first smart mobile device is configured to connect to a server system and synchronize the memory device and a database of the server system, and said user command is entered by a keyboard device of the first smart mobile device, and the first smart mobile device is configured to take the user command as the control command. The first smart mobile device is configured to process the user command as the control command according to a computer program product stored in the smart appliance control system.

In an embodiment of the present disclosure, the connecting interface device is connected to the first smart mobile device through a universal serial bus (USB) interface, a Lightning interface, WiFi, Bluetooth or near field communication (NFC). The central controlling device sends the appliance control command to the at least one appliance through WiFi, Bluetooth, Zigbee, Z-wave or near field communication (NFC).

In an embodiment of the present disclosure, the smart appliance control system further includes an audio device, which is electrically connected to the central controlling device. The central controlling device is configured to execute the corresponding action according to the control command to control the audio device outputs a voice message. In a preferred embodiment, said smart appliance control system further includes a display device, which is electrically connected to the connecting interface device. The central controlling device is configured to execute the corresponding action according to the control command to control the display device output a video message.

The aforesaid user command is sent to the first smart mobile device by a second smart mobile device.

In an embodiment of the present disclosure, the smart appliance control system further includes a driving device, which is electrically connected to the central controlling device. The central controlling device is configured to execute the corresponding action according to the control command to control the driving device generate a displacement of the smart appliance control system. In a preferred embodiment, the smart appliance control system further includes a photodetecting device, which is electrically connected to the central controlling device. The central controlling device is configured to execute the corresponding action according to the control command to control the photodetecting device detect an environment image, and send the environment image to the first smart mobile device. Moreover, the smart appliance control system further includes a gas detecting device, which is electrically connected to the central controlling device and configured to detect an air composition data and send the air composition data to the first smart mobile device. When the first smart mobile device determines that the air composition data meets a predetermined condition, the first smart mobile device generates the control command and sends the control command to the central controlling device.

In conclusion, the present disclosure directly executes a corresponding action or controls smart appliance to execute the corresponding action after using a first smart mobile device to recognize a user command or detect a predetermined condition. The first smart mobile device may be a smart mobile device that is replaced and not continuously used by the user so that the replaced smart mobile device can be reused and manufacturing cost of the smart appliance control system can be reduced.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure. Moreover, the description of steps is not used to limit the execution sequence thereof. Any device with an equivalent effect through rearrangement is also covered by the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
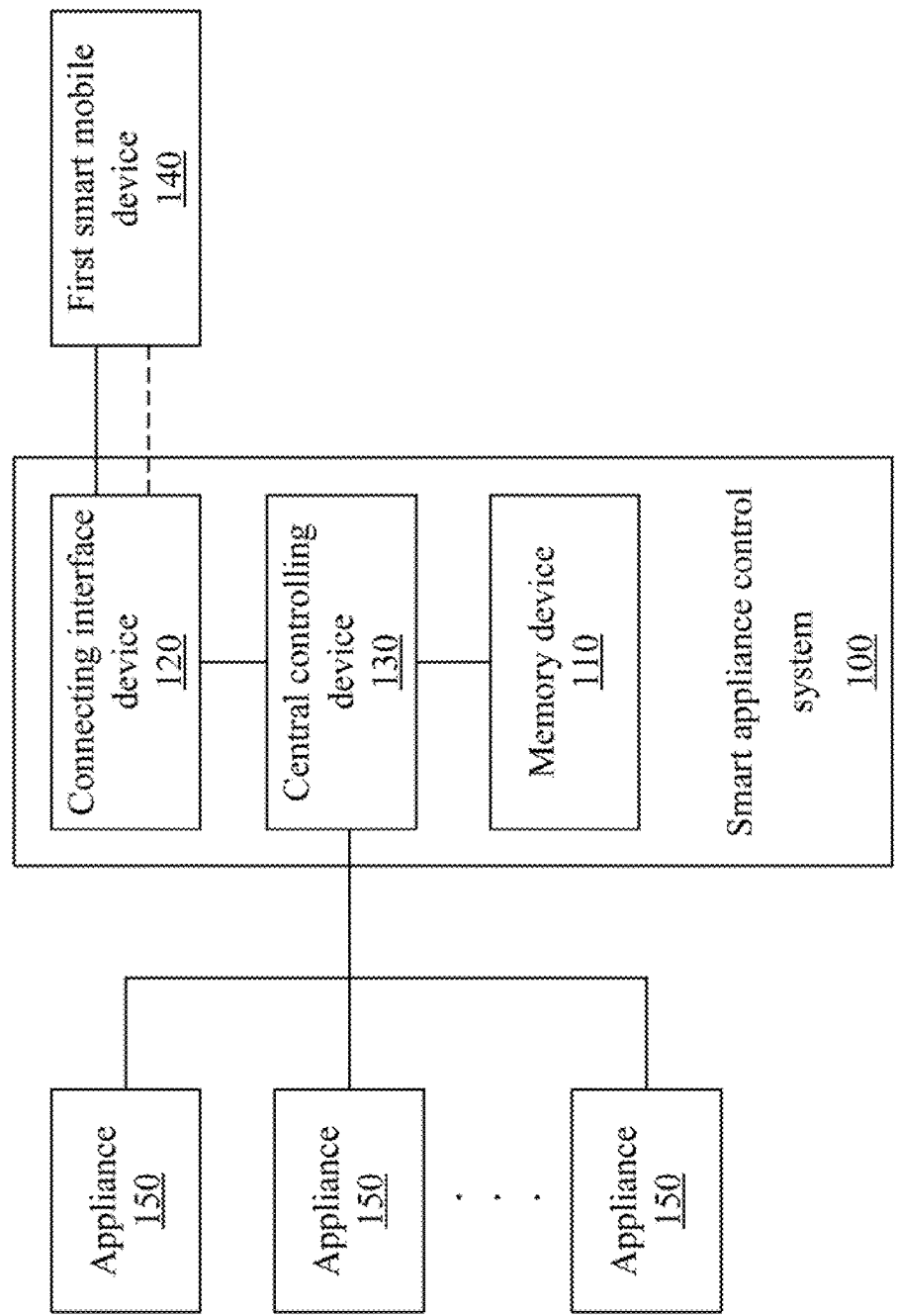
FIG. 1 is a schematic diagram of a smart appliance control system according to an embodiment of the present disclosure.

FIG. 1 is a schematic diagram of a smart appliance control system 100 according to an embodiment of the present disclosure. The smart appliance control system 100 includes a memory device 110, a connecting interface device 120 and a central controlling device 130. The central controlling device 130 is electrically connected to the memory device 110 and the connecting interface device 120. The connecting interface device 120 is configured to accommodate first smart mobile device 140, and connect to the first smart mobile device 140. The aforementioned means of connecting to the first smart mobile device 140 includes wire connection (as shown by solid lines between the connecting interface device 120 and the first smart mobile device in FIG. 1) or wireless connection (as shown by dashed lines between the connecting interface device 120 and the first smart mobile device in FIG. 1). For example, the wire connection may be a universal serial bus (USB) interface, a Lightning interface, and the wireless connection may be WiFi, Bluetooth or near field communication (NFC). However, the present disclosure is not limited to this example.

When the connecting interface device 120 and the first smart mobile device 140 are connected through wire connection, the connecting interface device 120 can accommodate the first smart mobile device 140, provide power to the first smart mobile device 140 and communicate with the first smart mobile device 140. On the other hand, when the connecting interface device 120 and the first smart mobile device 140 are connected through wireless connection, the first smart mobile device 140 can be separated from the smart appliance control system 100. In other words, a user can carry the first smart mobile device 140 to other positions in a coverage range of wireless signal, and send a control command to the smart appliance control system 100 through the first smart mobile device 140 to directly execute a corresponding action or control an appliance 150 to execute the action.

In operation, the user can use the first smart mobile device 140 to send a user command to control the smart appliance control system 100 to execute the corresponding action. The user command may be an audio command, video command or a command entered by the user through a physical/virtual keyboard or physical/virtual buttons. The first smart mobile device 140 is configured to receive the user command, process the user command as a control command that is readable by the smart appliance control system 100. For example, the first smart mobile device 140 receives the user's audio command "turn on the air conditioner in the living room," and processes the user audio command as a control command that is readable by the smart appliance control system 100 after audio recognition.

The connecting interface device 120 of the smart appliance control system 100 is configured to receive the control command sent by the first smart mobile device 140, and sends the control command to the central controlling device 130. The central controlling device 130 is configured to execute one of operations according to control command, and the operations are as follows: (A) a corresponding action is executed directly, e.g., voice output and image output, and back up the control command and information of the corresponding action into the memory device 110; and (B) when the control command is related to appliance control, the central controlling device 130 converts the control command into at least one appliance control command that is readable by the appliance 150, and then send the appliance control command to the at least one appliance 150 to control the at least one appliance to execute the corresponding action. For example, the corresponding action executed by the appliance may include turning on or turning off a light and an air conditioner. However, the present disclosure is not limited to this example.

The aforementioned appliance control command includes a command in WiFi, Bluetooth, Zigbee, Z-wave, NFC, or another appropriate communication protocol. However, the present disclosure is not limited to this example. In other words, the central controlling device 130 can control the at least one appliance 150 according to control command without limitation of using the same communication protocol to control all of the appliance 150. For example, the central controlling device can control first appliance 150 through WiFi, control second appliance 150 through Bluetooth, and control third appliance 150 through Zigbee, and so on. Moreover, the central controlling device 130 is configured to back up the control command, the appliance control command and information of the corresponding action in the memory device 110, which can omit recognizing process for similar user commands and therefore improve executing efficiency.

In practice, the central controlling device 130 may be one or more chips of the aforementioned communication protocols. The memory device 110 includes a random access memory (RAM), read-only memory (ROM). However, the present disclosure is not limited to this example.

Figure 2:
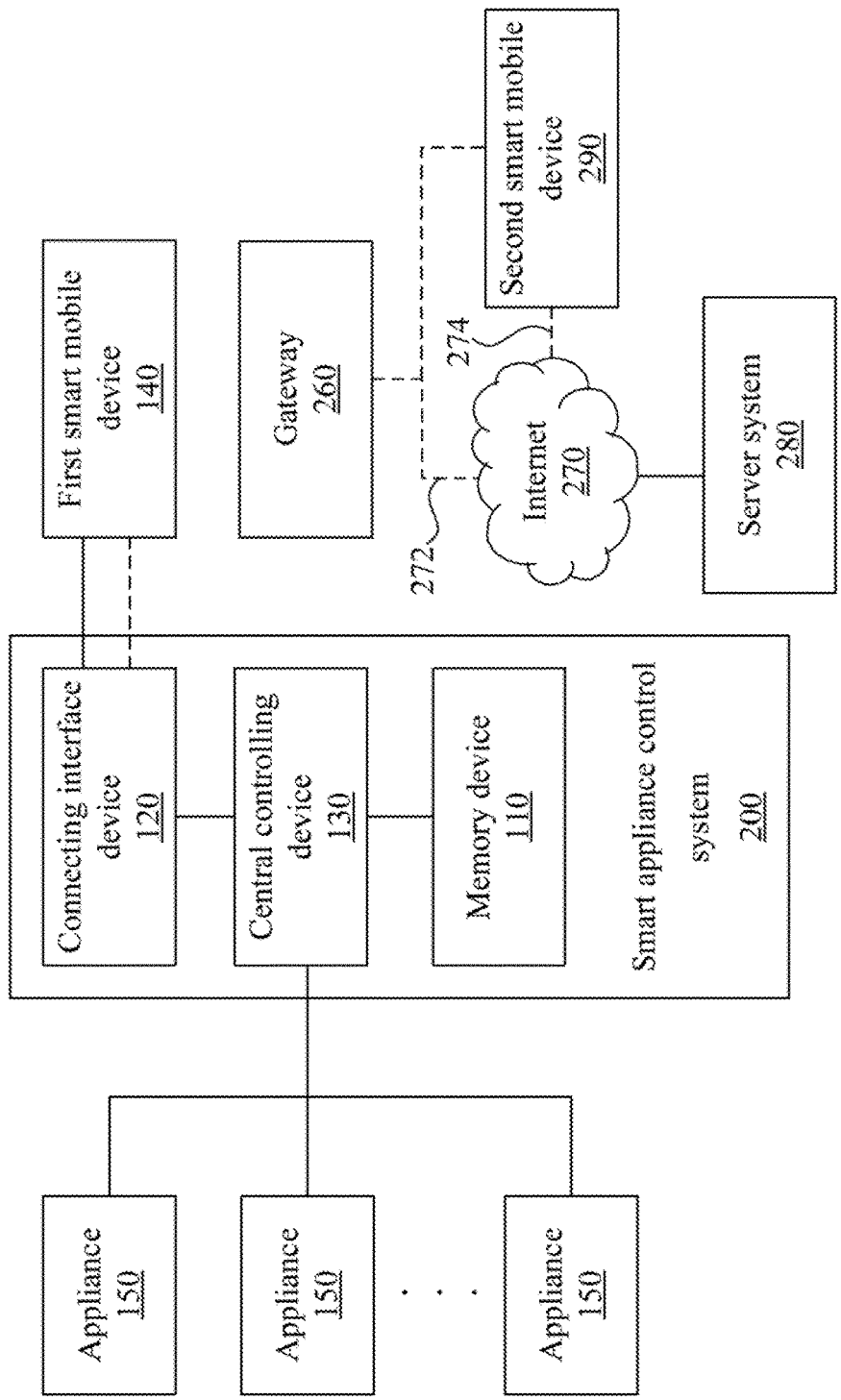
FIG. 2 is a schematic diagram of a smart appliance control system according to an embodiment of the present disclosure.
Figure 3:
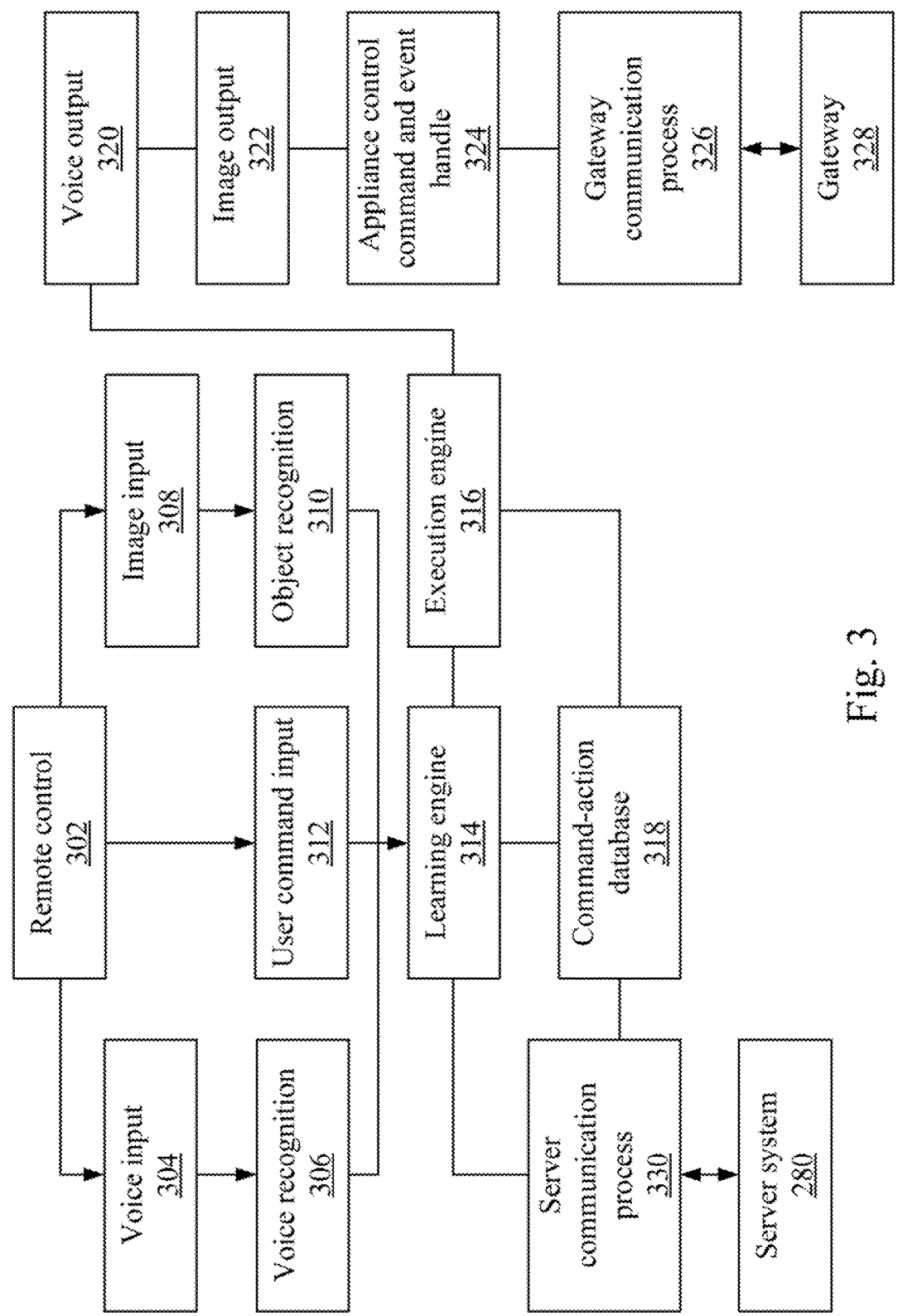
FIG. 3 is a schematic diagram of software for a smart appliance control system according to an embodiment of the present disclosure.
Figure 4:
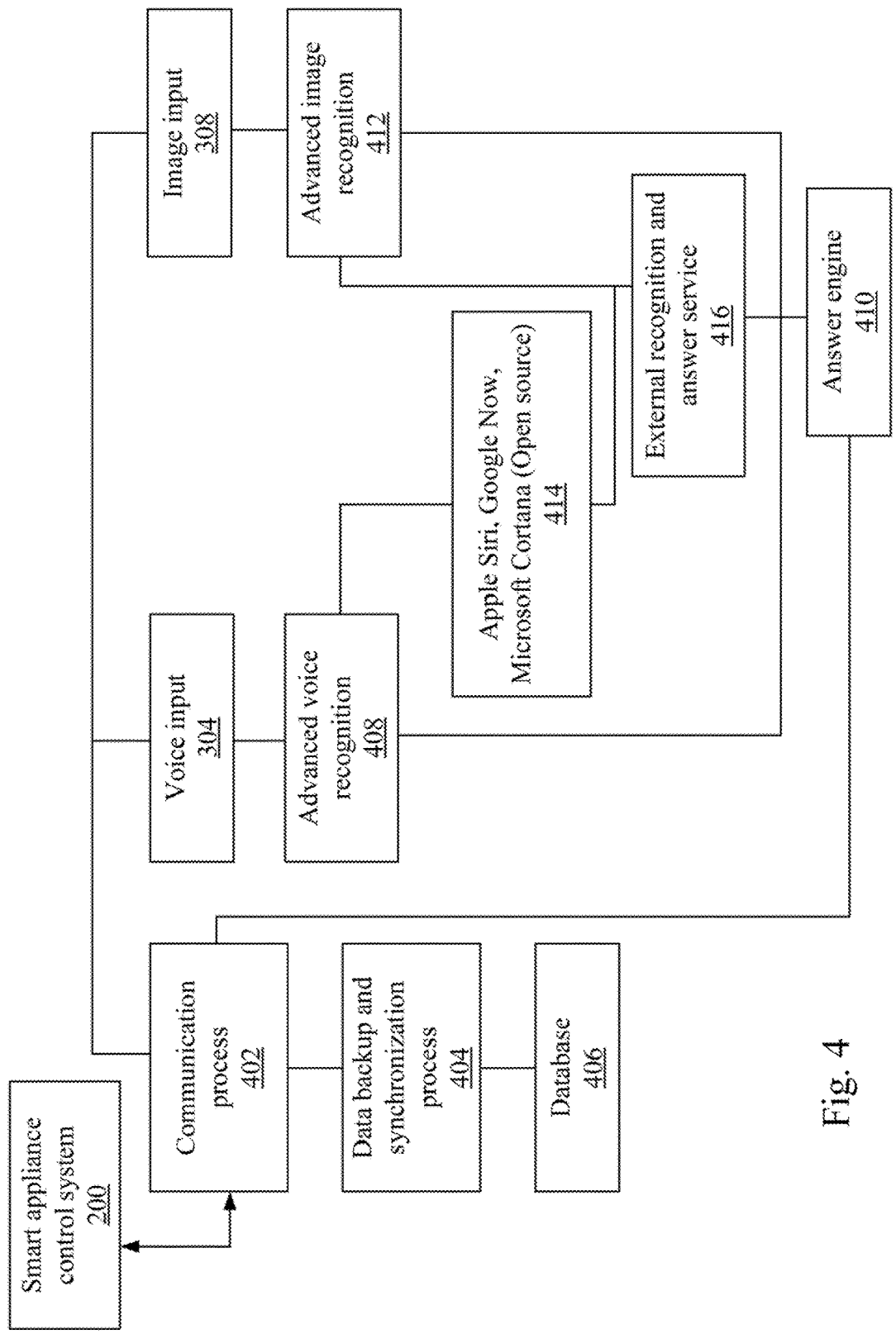
FIG. 4 is a schematic diagram of software of a server according to an embodiment of the present disclosure.

In order to further describe how user commands in different forms are processed as control commands, reference is made to FIGS. 2-4. FIG. 2 is a schematic diagram of a smart appliance control system 200 according to an embodiment of the present disclosure. FIG. 3 is a schematic diagram of software for a smart appliance control system according to an embodiment of the present disclosure. The software for the smart appliance control system can be implemented as a computer product, and stored in the first smart mobile device 140. FIG. 4 is a schematic diagram of software of a server according to an embodiment of the present disclosure. A gateway 260 is configured to communicate with the first smart mobile device 140, Internet 270 and the second smart mobile device 290.

The user can directly send the user command through an input device (e.g., an audio input device, a video input device or a keyboard input device) of the first smart mobile device. The user command can also be sent through remote control 302 (e.g., second smart mobile device 290). For example, the user uses the second smart mobile device 290 to send the user command, and sends the user command to the first smart mobile device 140 through the gateway 260. In another embodiment, the user uses the second smart mobile device 290 to send the user command, and the user command is sent to the gateway 260 through Internet 270, and then sent to the first smart mobile device 140 through the gateway 260.

The aforementioned second smart mobile device is connected to Internet 270 through connection 274. For example, the connection 274 may be the third generation of mobile phone mobile communication technology standards (3G), the fourth generation of mobile phone mobile communication technology standards (4G) or general packet radio service (GPRS). The gateway 260 and Internet 270 are connected through connection 272. The connection 272 includes wide area network (WAN). However, the present disclosure is not limited to this example. In practice, the gateway 260 may be a router.

When the user command sent by the user is a voice input 304, i.e., an audio command. For example, the voice input 304 can be received through a microphone or another voice distracting device of the first smart mobile device 140 or the second smart mobile device 29. The first smart mobile device 140 executes voice recognition 306 to generate the control command. A learning engine 314 is configured to learn a corresponding relation of the entered audio command and the recognized control command. The first smart mobile device 140 controls the smart appliance control system 200 to directly execute a corresponding action (e.g., voice output 320, image output 322) through an execution engine 316 according to the control command, or executes appliance control command and event handle 324, i.e., the control command is converted into an appliance control command in a communication protocol that is readable by the appliance 150. For example, gateway communication process 326 is executed through the gateway 328 to convert the control command of the first smart mobile device 140 into the appliance control command, and send the appliance control command to the appliance 150 in order to control the appliance 150. The gateway 328 can be integrated in the central controlling device 130. As aforementioned, the central controlling device 130 backs up the control command, the appliance control command and information of the corresponding action in the database 318, which can omit recognizing process of similar user command and therefore improve executing efficiency. For example, a command-action database 318 can be in the memory device 110 of the smart appliance control system 200. If the first smart mobile device 140 cannot recognize the voice input 304, then executes a server communication process 330 through the learning engine 314 to send the voice input 304 to the server system 280 for further recognizing the voice input 304.

As shown in FIG. 4, the server system 280 receives the voice input 304 that cannot be recognized from the smart appliance control system 200 through a communication process 402. If the server system 280 executes advanced voice recognition 408 to successfully recognize the voice input 304 and generate the control command, then an answer engine 410 executes a communication process 402 to return the control command to the first smart mobile device 140, and executes data backup and synchronize process 404 to back up the control command in the database 406.

If the server system 280 executes the advanced voice recognition 408 and voice input 304 still cannot be recognized, then the voice input is needed to be recognized through an external recognition and answer service 416 (e.g., an external recognition system or an expert system), such as through Apple Siri, Google Now, Microsoft Cortana, Sirius (414) or another appropriate voice recognition service. The answer engine 410 executes communication process 404 to return the recognized control command to the first smart mobile device 140, and execute data backup and synchronization process 404 to back up the control command in the database 406 of the server system 280.

Similarly, when the user command sent by the user is an image input 308, i.e., a video command. For example, the image input 308 can be received through a camera or another image distracting device of the first smart mobile device 140 or the second smart mobile device 290. The first smart mobile device 140 executes object recognition 310 to generate the control command. The learning engine 314 learns a corresponding relation of the entered video command and the recognized control command. The first smart mobile device 140 controls the smart appliance control system 200 to directly execute the corresponding action (e.g., the voice output 320, the image output 322) through the execution engine 316 according to control command, or executes appliance control command and event handle 324, i.e., the control command is converted into an appliance control command in a communication protocol that is readable by the appliance 150. For example, gateway communication process 326 is executed through the gateway 328 to convert the control command of the first smart mobile device 140 into the appliance control command, and send the appliance control command to the appliance 150 in order to control the appliance 150. The gateway 328 can be integrated in the central controlling device 130. Therefore, the user can set that when a particular object in the image input 308 is detected, then a predetermined control command is generated to execute a particular action. For example, if the first smart mobile device 140 detects a image that a user enters the living room (i.e., the first smart mobile device 140 recognizes that the user appears in the image input 308), then the first smart mobile device 140 generates a control command to control the smart appliance control system 200 to turn on light or air conditioner of the living room or output a voice message to send greetings to the user. However, the present disclosure is not limited to this example. As above mentioned, the central controlling device 130 backs up the control command, the appliance control command and information of the corresponding action in the command-action database 318, which can omit recognizing process of similar user command and therefore improve executing efficiency. If the first smart mobile device 140 cannot recognize the video command, then executes server communication process 330 through the learning engine 314 to send the image input 308 to the server system 280 for further recognizing the image input 308.

As shown in FIG. 4, the server system 280 receives the image input 308 that cannot be recognized from the smart appliance control system 200 through a communication process 402. If the server system 280 executes advanced object recognition 412 to successfully recognize the image input 308 and generate the control command, then the answer engine 410 executes communication process 402 to return the control command to the first smart mobile device 140, and executes data backup and synchronization process 404 to back up the control command in the database 406.

If the server system 280 executes the advanced object recognition 412 and the image input 308 still cannot be recognized, then the image input is needed to be recognized through external recognition and answer service 416 (e.g., an external recognize system or an expert system), executes communication process 404 to return the recognized control command to the first smart mobile device 140, and executes data backup and synchronization process 404 to back up the control command in the database 406 of the server system 280.

On the other hand, when a user command input 312 sent by the user through using the remote control 302 is an explicit command, e.g., a command entered by the user through physical/virtual keyboard or physical/virtual buttons, then the first smart mobile device 140 enters the user command input 312 as the control command. The first smart mobile device 140 directly controls the smart appliance control system 200 according to control command through the execution engine 316 to execute the corresponding action (e.g., a voice output 320, an image output 322), or execute appliance control command or event handle 324, i.e., converting a control command into an appliance control command in a communication protocol that is readable by the appliance 150. For example, a gateway 328 executes gateway communication process 326 to convert a control command of the first smart mobile device 140 into an appliance control command, and sends the appliance control command to the appliance 150 for controlling the appliance 150. The gateway 328 can be integrated in the central controlling device 130. For example, the user clicks a virtual button "turn on," "kitchen" and "light" to turn on the light in the kitchen through the first smart mobile device 140, then the first smart mobile device 140 directly takes "turn on, kitchen, light" as a control command, and sends the control command to the smart appliance control system 200. The smart appliance control system 200 converts the control command convert into an appliance control command, and sends the appliance control command to a light control device to turn on the light in the kitchen. As above mentioned, the central controlling device 130 backs up the control command, the appliance control command and information of the corresponding action in the command-action database 318, which can further improve executing efficiency of a similar command. For example, the command-action database 318 can be in the memory device 110 of the smart appliance control system 200.

In order to improve data share of data in different memory devices 110 of different smart appliance control systems 200, and prevent permanent data loss in the smart appliance control system 200 due to a breakdown, in one embodiment, data in memory device 110 the of the smart appliance control system 200 are backed up in the database 406 of the server system 280 through data backup and synchronization process 404. Therefore, the database 406 of the server system 280 stores different recognition results of the user commands in the smart appliance control systems 200, which can improve ability of the server system for advanced voice recognition 408 and/or advanced object recognition 412, and back up data in separate memory device 110 of the smart appliance control systems 200 to avoid permanent data loss due to a breakdown.

Figure 5:
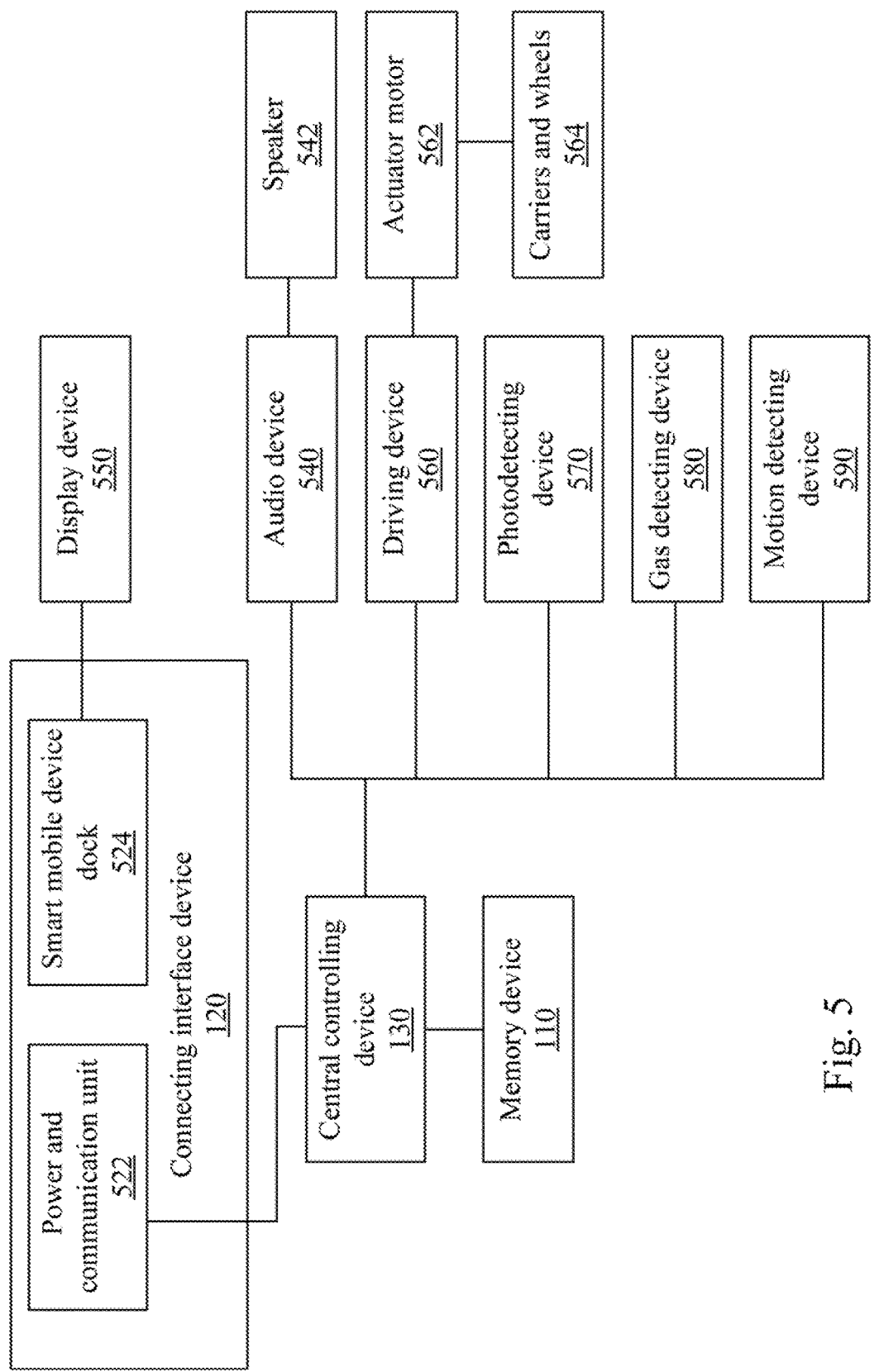
FIG. 5 is a schematic diagram of a smart appliance control system according to an embodiment of the present disclosure.

The smart appliance control system can be equipped with various detecting devices and/or driving devices according to actual demands. FIG. 5 is a schematic diagram of a smart appliance control system 500 according to an embodiment of the present disclosure. Compared to the smart appliance control system 200 in FIG. 2, the smart appliance control system 500 in FIG. 5 further includes one or combination of an audio device 540, a speaker 542, a display device 550, a driving device 560, an actuator motor 562, carriers and wheels 564, a photodetecting device 570, a gas detecting device 580, and a motion detecting device 590. The connecting interface device 120 includes a power and communication unit 522 and a smart mobile device dock 524. The power and communication unit 522 is configured to provide power to the first smart mobile device 140, and communicate with the first smart mobile device 140 through wire connection or wireless connection. The smart mobile device dock 524 is configured to accommodate the first smart mobile device 140 when the first smart mobile device 140 is connected to the power and communication unit 522 through wire connection.

In one embodiment, the smart appliance control system 500 includes an audio device 540, which is electrically connected to the central controlling device 130. The central controlling device 130 is configured to execute a corresponding action according to the control command to control the audio device 540 to output a voice message to a speaker 542. For example, when the first smart mobile device 140 recognizes a particular family member from the image input, the smart appliance control system 500 outputs a voice message that recorded in advance by the user to the particular family member through the audio device 540 and the speaker 542 for sending information to the particular family member.

In another embodiment, the smart appliance control system 500 includes a display device 550, which is electrically connected to the smart mobile device dock 524 of the connecting interface device 120. The central controlling device 130 is configured to control the display device 550 to output a video message according to the control command execute corresponding action. For example, after the user enters a command in the first smart mobile device 140 and the first smart mobile device 140 recognizes the command, the smart appliance control system 500 outputs a video message to response to the user through the display device 550. In practice, the display device 550 may be a plasma display panel, a liquid crystal display (LCD), a thin film transistor liquid crystal display (TFT-LCD), a light emitting diode (LED) display, an organic light emitting diode (OLED) display, or another display device.

In one embodiment, the smart appliance control system 500 includes a driving device 560, which is electrically connected to the central controlling device 130. The central controlling device 130 is configured to execute a corresponding action according to the control command to make the driving device 560 to control an actuator motor 562. The actuator motor 562 then drives carriers and wheels 564 to generate a displacement of the smart appliance control system 500, move the smart appliance control system 500. For example, after the user enters a command in the first smart mobile device 140 and the first smart mobile device 140 recognizes the command, the smart appliance control system 500 patrols or clean indoor environment through the driving device 560, the actuator motor 562, the carriers and wheels 564. In the present embodiment, the carriers and wheels 564 can also be implemented as another type of propellers.

In another embodiment, the smart appliance control system 500 includes a photodetecting device 570, which is electrically connected to the central controlling device 130. The central controlling device 130 is configured to execute a corresponding action according to control command to control the photodetecting device 570 to detect environment image around the smart appliance control system 500, and send the environment image to the first smart mobile device 140. For example, after the user enters a command in the first smart mobile device 140 and the first smart mobile device 140 recognizes the command, the smart appliance control system 500 detects a home environment image through the photodetecting device 570, and sends the home environment image to the first smart mobile device 140. Therefore, even though the user is on another location, the user can also know environmental status about of a location of the smart appliance control system 500 at any time. In practice, the photodetecting device 570 includes a device with ability of night vision, such as an infrared light emitting diode (IR LED). However, the present disclosure is not limited to this example.

The detecting device of the smart appliance control system 500 can also be a source of a control command. In one embodiment, the smart appliance control system 500 includes a gas detecting device 580, which is electrically connected to the central controlling device 130. The gas detecting device 580 is configured to detect air composition data around the smart appliance control system 500, and send the air composition data to the first smart mobile device 140. When the first smart mobile device 140 determines that the air composition data satisfy a predetermined condition (e.g., some ingredient in the air reaches a certain concentration), the first smart mobile device 140 generates a control command and sends the control command to the central controlling device 130. Therefore, the central controlling device 130 is configured to execute a corresponding action according to the control command. For example, when the first smart mobile device 140 determines that concentration of carbon dioxide is too high according to the air composition data detected by the gas detecting device 580, the first smart mobile device 140 sends the control command to the central controlling device 130 to generate a voice message and/or a video message for informing the user. In another embodiment, the central controlling device 130 executes the corresponding action according to the control command to control the gas detecting device 580 to detect the air composition data, and sends the air composition data to the first smart mobile device 140. In practice, the gas detecting device 580 may be one or more gas detectors or chips. However, the present disclosure is not limited to this example.

Similarly, in another embodiment, the smart appliance control system 500 includes a motion detecting device 590, which is electrically connected to the central controlling device 130. The motion detecting device 590 can operate as the gas detecting device 580. In practice, the motion detecting device 590 may be one or more acceleration detectors or chips. However, the present disclosure is not limited to this example.

It should be note that, the aforementioned various detecting devices and/or driving devices are merely for illustrative purpose, and not configured to limit the present disclosure. According to actual demand, the smart appliance control system 500 may also include another appropriate detecting device and/or driving device.

In practice, the first smart mobile device 140 and/or the second smart mobile device 290 may be a smart phone, a tablet personal computer (tablet PC). However, the present disclosure is not limited to this example.

In conclusion, through the embodiments, the present disclosure can directly executes a corresponding action or controls smart appliance to execute the corresponding action after using a first smart mobile device to recognize a user command or detect a predetermined condition. The first smart mobile device may be a smart mobile device that is replaced and not continuously used by the user so that the replaced smart mobile device can be reused and manufacturing cost of the smart appliance control system can be reduced.

Even though the present disclosure is disclosed as above, the disclosure is not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. A smart appliance control system, comprising:
  a memory device;
  a connecting interface device, configured to accommodate a first smart mobile device, and connected to the first smart mobile device;
  a central controlling device, electrically connected to the memory device and the connecting interface device, and configured to convert a control command into an appliance control command that is readable by at least one appliance; and a server system, wherein the first smart mobile device is configured to connect to the server system and synchronize the memory device and a database of the server system;

wherein the first smart mobile device is configured to receive a user command and process the user command as the control command;

the connecting interface device is configured to receive the control command that is sent by the first smart mobile device, and send the control command to the central controlling device;

the central controlling device is configured to execute one of operations as follows according to the control command:

(A) executing a corresponding action, and backing up the control command and information of the corresponding action in the memory device; and (B) converting the control command into the appliance control command that is readable by the at least one appliance, and sending the control command to the at least one appliance to control the at least one appliance to execute the corresponding action, and backing up the control command, the appliance control command and the information of the corresponding action in the memory device, wherein when the first smart mobile device is unable to recognize the user command, the first smart mobile device is configured to connect to the server system and send the user command to the server system to recognize the user command to generate the control command, wherein when the server system is unable to recognize the user command, the server system is configured to connect to an external recognition and answer service to recognize the user command, wherein the server system stores the control command in a database of the server system and return the control command to the first smart mobile device.

2. The smart appliance control system of claim 1, wherein the user command is an audio command, the first smart mobile device is configured to recognize the audio command to generate the control command;

when the first smart mobile device is unable to recognize the audio command, the first smart mobile device is configured to connect to the server system and send the audio command to the server system;

the server system is configured to recognize the audio command to generate the control command, back up the control command in a database of the server system, and return the control command to the first smart mobile device.

3. The smart appliance control system of claim 1, wherein the user command is a video command, the first smart mobile device is configured to recognize the video command to generate the control command;

when the first smart mobile device is unable to recognize the video command, the first smart mobile device is configured to connect to the server system and send the video command to the server system;

the server system is configured to recognize the video command to generate the control command, back up the control command in a database of the server system, and return the control command to the first smart mobile device.

4. The smart appliance control system of claim 1, wherein the user command is entered by a keyboard device of the first smart mobile device, and the first smart mobile device is configured to take the user command as the control command.

5. The smart appliance control system of claim 1, wherein the first smart mobile device is configured to process the user command as the control command according to a computer program product stored in the smart appliance control system.

6. The smart appliance control system of claim 1, wherein the connecting interface device is connected to the first smart mobile device through a universal serial bus (USB) interface, a Lightning interface, WiFi, Bluetooth or near field communication (NFC).

7. The smart appliance control system of claim 1, wherein the central controlling device sends the appliance control command to the at least one appliance through WiFi, Bluetooth, Zigbee, Z-wave or near field communication (NFC).

8. The smart appliance control system of claim 1, further comprising:

an audio device, electrically connected to the central controlling device;

wherein the central controlling device is configured to execute the corresponding action according to the control command to control the audio device to output a voice message.

9. The smart appliance control system of claim 1, further comprising:

a display device, electrically connected to the connecting interface device; wherein the central controlling device is configured to execute the corresponding action according to the control command to control the display device to output a video message.

10. The smart appliance control system of claim 1, wherein the user command is sent to the first smart mobile device by a second smart mobile device.

11. The smart appliance control system of claim 1, further comprising:

a driving device, electrically connected to the central controlling device; wherein the central controlling device is configured to execute the corresponding action according to the control command to control the driving device to generate a displacement of the smart appliance control system.

12. The smart appliance control system of claim 1, further comprising:

a photodetecting device, electrically connected to the central controlling device; wherein the central controlling device is configured to execute the corresponding action according to the control command to control the photodetecting device to detect an environment image, and send the environment image to the first smart mobile device.

13. The smart appliance control system of claim 1, further comprising:

a gas detecting device, electrically connected to the central controlling device and configured to detect an air composition data and send the air composition data to the first smart mobile device;

wherein when the first smart mobile device determines that the air composition data meets a predetermined condition, the first smart mobile device generates the control command and sends the control command to the central controlling device.

* * * * *